United States Patent

Tress et al.

[11] Patent Number: 5,954,251
[45] Date of Patent: Sep. 21, 1999

[54] MOUNTING DEVICE FOR ROOF RACKS ON MOTOR VEHICLES, ESPECIALLY AUTOMOBILES

[75] Inventors: Andreas Tress, Bietigheim-Bissingen; Jan Roth, Stuttgart, both of Germany

[73] Assignee: Dr. Ing. h.c.F. Porsche AG, Weissach, Germany

[21] Appl. No.: 09/061,268

[22] Filed: Apr. 17, 1998

[30] Foreign Application Priority Data

Apr. 17, 1997 [DE] Germany ............................ 197 16 048

[51] Int. Cl.⁶ ........................................................ B60R 9/04
[52] U.S. Cl. .......................... 224/309; 224/326; 224/327
[58] Field of Search ................................... 224/309, 322, 224/326, 327

[56] References Cited

U.S. PATENT DOCUMENTS

| | | | |
|---|---|---|---|
| 4,754,905 | 7/1988 | Bott | 224/326 |
| 5,201,487 | 4/1993 | Epplett | 224/309 |
| 5,499,762 | 3/1996 | Lee | 224/326 |
| 5,535,930 | 7/1996 | Lee | 224/309 |
| 5,775,557 | 7/1998 | Arvidsson | 224/309 |
| 5,782,392 | 7/1998 | Yamamoto | 224/326 |

FOREIGN PATENT DOCUMENTS 32 01 171  7/1983  Germany.
36 37 856  5/1988  Germany.

*Primary Examiner*—Stephen P. Garbe
*Attorney, Agent, or Firm*—Evenson, McKeown, Edwards & Lenahan, P.L.L.C.

[57] ABSTRACT

A mounting device for roof racks on motor vehicles, especially automobiles, includes mounting elements located in longitudinal roof channels in which the endwise supporting parts of the roof racks can be secured. Each mounting element is formed by a base plate that rests on the bottom of the roof channel and is fastened thereto, on which plate at least one threaded section is formed for screwing in a mounting bolt for the supporting part. In order for high roof loads to be carried by the mounting device and readily conducted into the fixed body, on the underside of an upright rib of the supporting part, at least one supporting surface is provided that forms a sloping plane relative to the screwing direction in the transverse direction of the vehicle. The supporting surface abuts a corresponding supporting surface of the base plate that extends in the same direction and projects upward. At least one depressed groove is formed laterally next to the supporting surfaces on the base plate, which groove a downwardly projecting guide nose of the supporting part engages shapewise.

16 Claims, 4 Drawing Sheets

MOUNTING DEVICE FOR ROOF RACKS ON MOTOR VEHICLES, ESPECIALLY AUTOMOBILES

BACKGROUND AND SUMMARY OF THE INVENTION

The invention relates to a mounting device for roof racks on motor vehicles, and more particularly to a mounting device which is secured to longitudinally-extending roof channels.

A mounting device for a roof rack is known from German patent document DE 36 37 856 A1. An elongate base plate is locally mounted to the bottom of a roof channel that extends in the longitudinal direction of the vehicle, said plate being held in place by bolts to the sheet metal parts of the roof. The base plate also comprises an upwardly projecting threaded sleeve at whose top, when the flap is open, a supporting part of a roof rack, not shown in greater detail, can be fastened. The top of the threaded sleeve is aligned approximately horizontally.

In this arrangement, relatively high surface pressures develop in the connecting area of the threaded sleeve/supporting part because of the small cross section of the threaded sleeve, so that this design is suitable only for accepting and conducting relatively small forces and therefore only for small roof loads.

A goal of the invention is to provide a supporting part of a roof rack and a base plate secured to the body that accepts large roof loads and conducts them in a satisfactory manner into the fixed body.

This and other goals have been achieved according to the present invention by providing a mounting device for securing a roof rack on a motor vehicle having a roof channel extending in a longitudinal direction, said mounting device comprising: a base plate to be fastened to a bottom of the roof channel, said base plate defining at least one threaded section for receiving a mounting bolt; a support part which supports the roof rack, said support part having an upright rib with at least one support surface on a lower side thereof, said support surface sloping obliquely to said mounting bolt in a transverse direction of the vehicle, each of said at least one support surfaces engaging a respective corresponding support surface on an upper side of said base plate, said base plate defining at least one longitudinally extending depressed groove adjacent said corresponding support surface, said groove receiving a downwardly projecting guide nose of said support part.

This and other goals have been achieved according to the present invention by providing a mounting device for securing a roof rack on a motor vehicle having a roof channel extending in a longitudinal direction and having a width in a transverse direction, said mounting device comprising: a base plate including a longitudinally extending base portion to be engaged with said roof channel, and a raised portion extending upwardly from said base portion, said raised portion extending longitudinally along a portion of a longitudinal length of said base portion, an upwardly facing support surface of said raised portion being sloped along said transverse direction, said base portion defining a longitudinally extending groove on each longitudinal side of said raised portion; and a support part to be engaged with said roof rack, said support part including a downwardly facing support surface which matingly engages said upwardly facing support surface of the base plate, said support part having a guide nose extending downwardly adjacent each longitudinal end of the downwardly facing support surface that said guide noses are disposed in respective ones of said grooves defined in the base plate.

By designing the main support surface as a sloping plane with respect to the screwing direction, the forces conducted through the bolt can advantageously be divided into a horizontal component and a vertical component relative to the screwing direction. In addition, the sloping plane increases the supporting surface between the supporting part and the base plate, so that a lower surface pressure results. In addition, because of the sloping plane, regardless of manufacturing tolerances and possible wear, a 100% shapewise connection is always obtained. The shapewise connections provided laterally next to the supporting surfaces between the base plate and the supporting part conduct the forces that develop in the X and Y directions into the fixed body in a satisfactory manner, and the load on the screw connection is relieved.

Other objects, advantages and novel features of the present invention will become apparent from the following detailed description of the invention when considered in conjunction with the accompanying drawings.

DETAILED DESCRIPTION OF THE DRAWINGS

Referring to FIGS. 1–4, a motor vehicle, not shown in greater detail, has a depressed roof channel 2 located in the laterally external area on each side of a vehicle roof 1, said channel extending in the longitudinal direction of the vehicle (i.e. in the driving direction) and being closed at the top by a covering strip 3.

Figure 3:
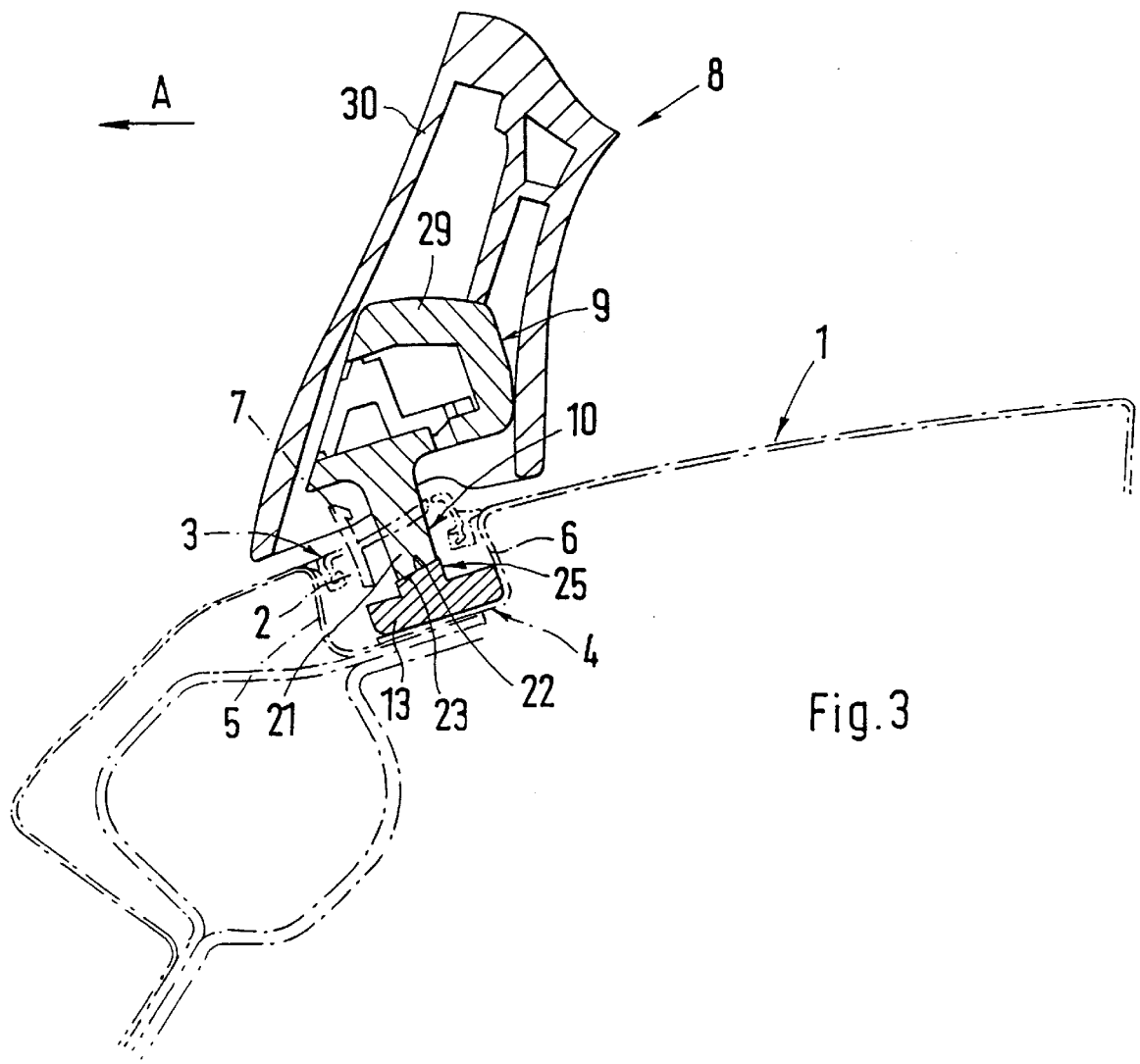
FIG. 3 is a section along line III—III in FIG. 2.
Figure 4:
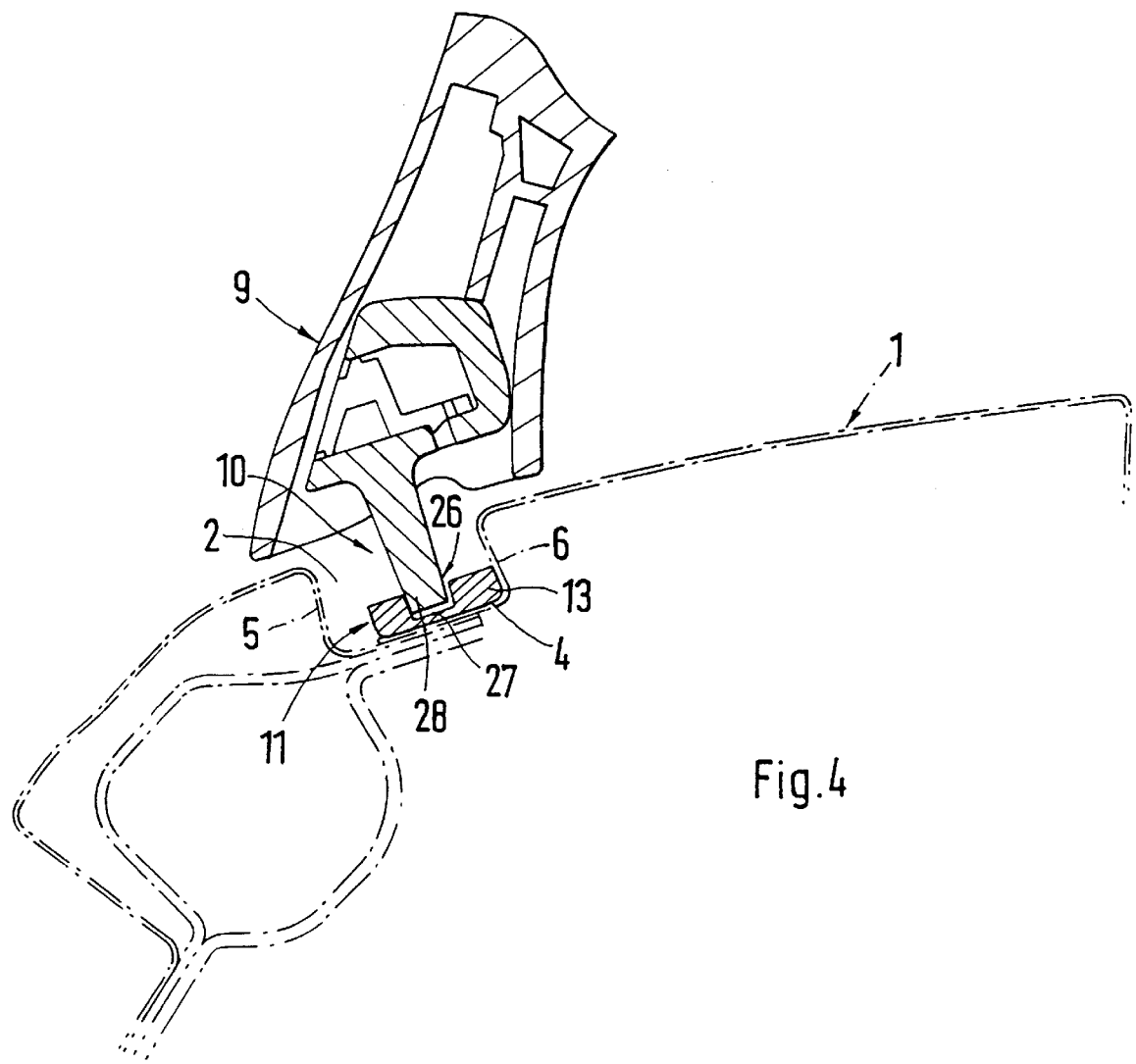
FIG. 4 is a section along line IV—IV in FIG. 2.

FIGS. 3 and 4 show the left half of vehicle roof 1 as viewed in the travel direction and associated roof channel 2. The right half, not shown, is mirror symmetrical with the left half. Each roof channel 2, extending substantially over the entire length of vehicle roof 1, is shaped approximately like a U in cross section and is composed of a bottom 4 and two upright side walls 5, 6 spaced apart from one another. To mount a roof rack system, displaceable flaps 7 are provided at each covering strip 3 in a forward area and a rear area, said flaps being movable either by pivoting or shifting into a release position. According to FIG. 3, flaps 7 can be pivoted upward from a closed position into an upright released position.

The roof rack system comprises a forward transverse roof rack and a rear transverse roof rack, with only the endwise supporting parts 9 of roof racks 8 being shown in FIGS. 3 and 4, but not the transverse members connecting them. Each roof rack 8 is held in place on fixed vehicle roof 1 at its two laterally external ends by a mounting device 10. Each mounting device 10 comprises a mounting element 11 located locally in roof channel 2, to which element the endwise supporting part 9 of roof rack 8 can be secured by means of at least one upright mounting bolt 12.

Each mounting element 11 is formed by a base plate 13 that rests on bottom 4 of roof channel 2 and is fastened thereto. At least one threaded section 14 is formed on base plate 13 to receive mounting bolt 12, screwed in from above, for supporting part 9.

Figure 1:
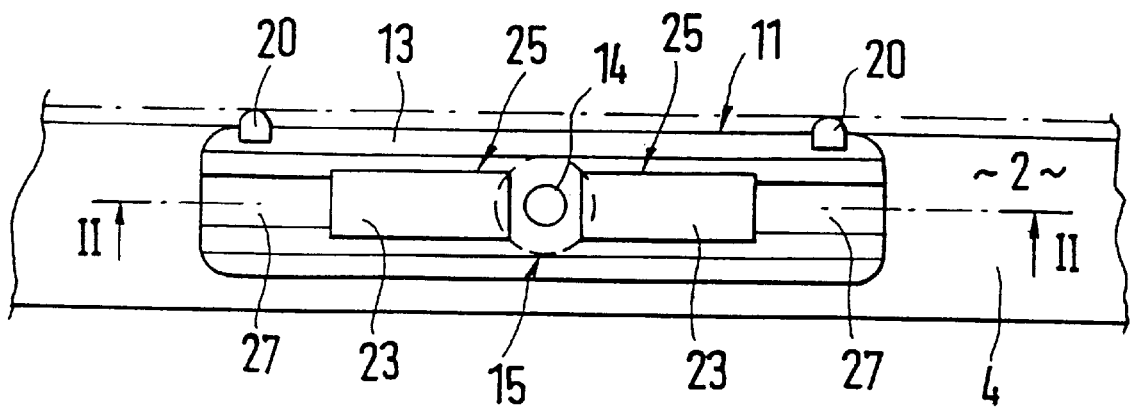
FIG. 1 is a partial top view of a laterally external roof channel of an automobile with the base plate inserted but without the cover strip, according to a preferred embodiment of the present invention.
Figure 2:
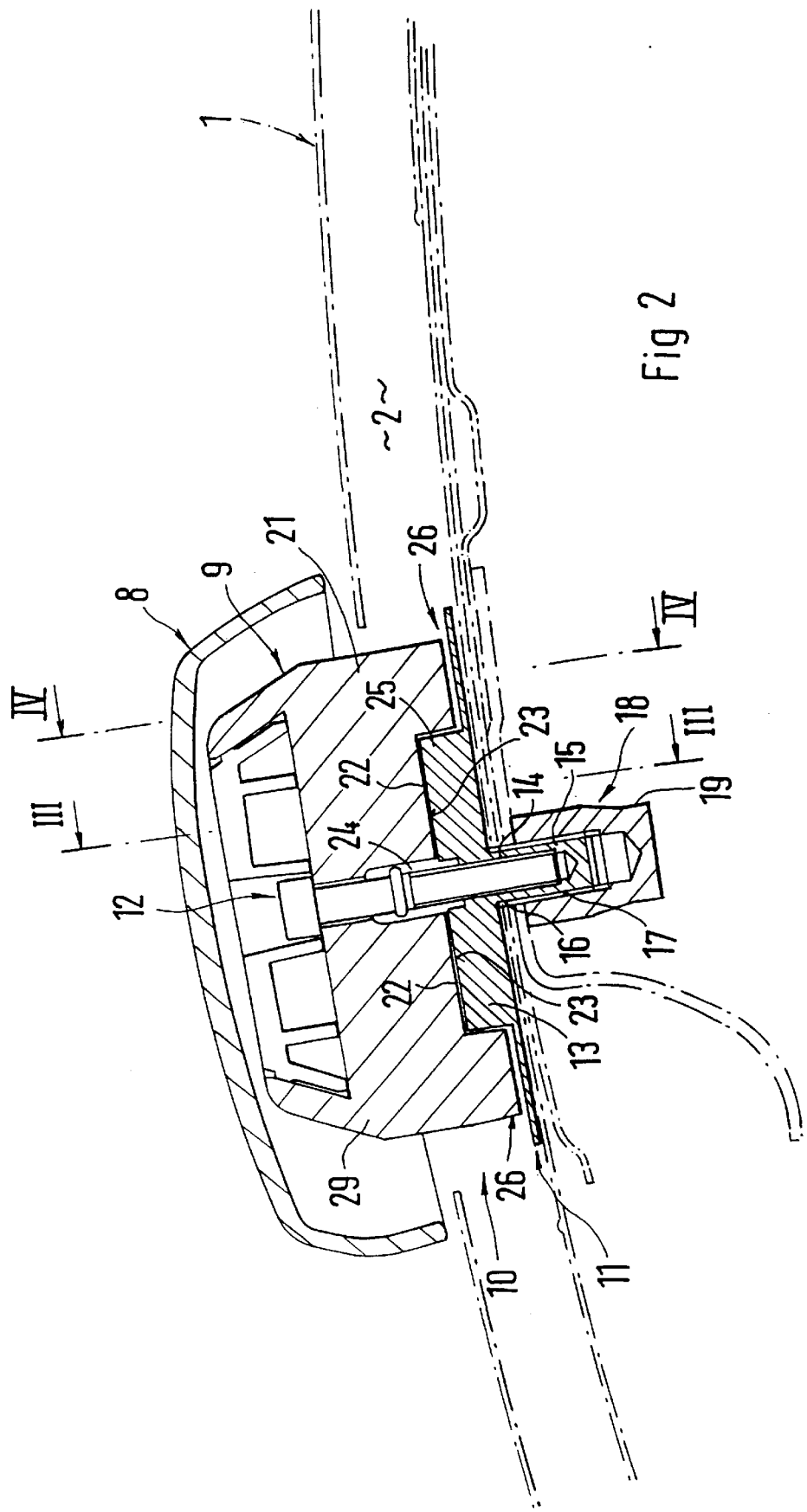
FIG. 2 is a section along line II—II in FIG. 1 with a supporting part of a roof rack inserted.

In the illustrated embodiment, threaded section 14 is formed by an internal thread provided in an upright downwardly projecting retaining bolt 15 of elongate base plate 13. Retaining bolt 15 is provided approximately in a central area of the length of base plate 13. Retaining bolt 15 is guided through a bore 16 in the bottom of roof channel 2 and projects downward beyond roof channel 2 in the direction of the passenger compartment, with a cap nut 18 being mountable on an external thread 17 of retaining bolt 15 from below. Cap nut 18 has at its lower end an external hexagon 19 for tightening cap nut 18. However, two or more retaining bolts 15 can be provided to secure each base plate 13. For correct positioning of base plate 13 in roof channel 2, two tongues 20, spaced apart from one another and projecting laterally, are formed on one lengthwise side of base plate 13, said tongues abutting the adjacent upright internal side walls 6 of roof channel 2 (FIG. 1).

According to the invention, on the underside of an upright narrow rib 21 of supporting part 9 that extends along the length of the vehicle, at least one supporting surface 22 slopes in the transverse direction of the vehicle (see FIG. 3), forming a sloping plane for supporting the supporting part 9 on the base plate 13, relieving forces on the mounting bolt 12. The supporting surface 22 abuts a mating supporting surface 23 of base plate 13 that extends in the same direction in a rib portion that projects upward from a widened base portion of the base plate 13. The relatively narrow rib 21 provided in the transverse direction of the vehicle has a portion that projects into roof channel 2 (FIG. 3).

In the illustrated embodiment, upright rib 21 of supporting part 9 defines a recess 24 for receiving the central mounting bolt 12, the elongate supporting surfaces 22 extending on both sides of recess 24. The opposite supporting surfaces 23 on base plate 13 are provided on raised areas 25 which extend longitudinally on both sides of central threaded section 14 (see FIG. 2) to allow mounting bolt 12 to be screwed in.

Supporting surfaces 22 and 23 on supporting part 9 and on base plate 13 each rise toward the central lengthwise plane of the vehicle, while they taper downward toward exterior A of the vehicle (FIG. 3). Supporting surfaces 23 on base plate 13 are slightly wider than supporting surfaces 22 on supporting part 9 in the transverse direction of the vehicle (see FIG. 3), so that depending on the tolerance, it is possible to shift supporting part 9 in the transverse direction of the vehicle relative to fixed base plate 13.

Supporting surfaces 22 on supporting part 9 are slightly longer than supporting surfaces 23 on base plate 13 located beneath in the longitudinal direction of the vehicle (see FIG. 2), so that supporting part 9 can be displaced in the longitudinal direction of the vehicle by a certain amount relative to base plate 13.

At least one shapewise connection 26 is provided next to supporting surfaces 22, 23 between base plate 13 and supporting part 9 at longitudinal ends thereof. For this purpose, a depressed groove 27 is formed at longitudinal ends of the base plate 13, i.e. longitudinally outside the raised area 25, into which grooves respective downwardly projecting guide noses 28 of supporting part 9 engage shapewise. By virtue of this shapewise connection 26, the forces that develop are conducted in a satisfactory manner in the Y and X directions and the load on the screw connection is relieved (FIG. 4).

In the illustrated embodiment, the shapewise connection 26 is provided in each of the forward and rear end areas of base plate 13 and supporting part 9. Rib 21 and/or the guide noses made integral with rib 21, as viewed in cross section, are made slightly wedge-shaped and taper downward. Depressed grooves 27 on base plate 13 are made slightly wider than guide noses 28 that project into the grooves 27 in the transverse direction of the vehicle (see FIG. 4). The lower edge of guide nose 28 does not abut the bottom of groove 27 but extends at a short distance from the bottom (FIG. 4).

In the illustrated embodiment, supporting part 9 is formed by an adapter 29 that can be connected by screws with a supporting foot 30 of roof rack 8. Alternatively, supporting part 9 may itself be a supporting foot 30 of roof rack 8, for example, the roof rack 8 may be integral (one-piece) with supporting part 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mounting device for securing a roof rack on a motor vehicle having a roof channel, said mounting device comprising:

a base plate to be fastened to a bottom of the roof channel, said base plate defining at least one threaded section for receiving a mounting bolt;

a support part which supports the roof rack, said support part having an upright rib extending in a longitudinal direction with a support surface on a lower side thereof, said support surface sloping obliquely to said at least one threaded section in a transverse direction transverse to said longitudinal direction, said support surface engaging a respective corresponding support surface on an upper side of said base plate, said base plate defining at least one longitudinally extending depressed groove adjacent said corresponding support surface, said groove receiving a downwardly projecting guide nose of said support part.

2. A mounting device according to claim 1, wherein said support surface of the support part and said corresponding support surface of the base plate slope upwardly.

3. A mounting device according to claim 1, wherein said upright rib comprises a pair of support surfaces, one on each side of said at least one threaded section, a pair of corresponding support surfaces being provided on said base plate.

4. A mounting device according to claim 1, wherein said corresponding support surface on the base plate is wider in said transverse direction than said support surface on the support part.

5. A mounting device according to claim 1, wherein said support surface on the support part is longer than said corresponding support surface on the base plate in said longitudinal direction.

6. A mounting device according to claim 1, wherein said groove defined in the base plate is wider than said guide nose in said transverse direction.

7. A mounting device according to claim 1, wherein a lower edge of said guide nose is spaced at a distance from a bottom of said groove.

8. A mounting device according to claim 1, wherein said support part is an adapter to be connected with a support foot of the roof rack.

9. A mounting device according to claim 1, wherein said support part is a support foot of the roof rack.

10. A mounting device according to claim 1, wherein said base plate includes at least two tongues, spaced apart from each other in said longitudinal direction and projecting in said transverse direction, said tongues to be abutted to an upright side wall of said roof channel.

11. A mounting device for securing a roof rack on a motor vehicle having a roof channel extending in a longitudinal direction and having a width in a transverse direction, said mounting device comprising:

a base plate including a longitudinally extending base portion to be engaged with said roof channel, and a raised portion extending upwardly from said base portion, said raised portion extending longitudinally along a portion of a longitudinal length of said base portion, an upwardly facing support surface of said raised portion being sloped along said transverse direction, said base portion defining a longitudinally extending groove on each longitudinal side of said raised portion; and a support part to be engaged with said roof rack, said support part including a downwardly facing support surface which matingly engages said upwardly facing support surface of the base plate, said support part having a guide nose extending downwardly adjacent each longitudinal end of the downwardly facing support surface that said guide noses are disposed in respective ones of said grooves defined in the base plate.

12. A mounting device according to claim 11, wherein said base plate defines a threaded section for engagement with a mounting bolt, and said support part defines a recess aligned with said threaded section for receiving the mounting bolt.

13. A mounting device according to claim 11, further comprising at least one mounting bolt which connects said base plate with said support part, said base plate defining a threaded section for engagement with a mounting bolt, and said support part defining a recess aligned with said threaded section for receiving the mounting bolt.

14. A mounting device according to claim 12, wherein said threaded section is defined by a retaining bolt portion of the base plate which extends downwardly from said base portion, said retaining bolt portion to be disposed extending through a bore in said roof channel.

15. A mounting device according to claim 11, wherein said support part is an adapter to be connected with a support foot of the roof rack.

16. A mounting device according to claim 11, wherein said support part is a support foot of the roof rack.

* * * * *